Patented Nov. 23, 1943

2,334,891

UNITED STATES PATENT OFFICE 2,334,891

VAT DYESTUFFS OF THE ANTHRAQUINONE SERIES

Alexander J. Wuertz, Melvin A. Perkins, and William T. Granger, Wilmington, Del., assignors to E. I. du Pont de Nemours & Company, Wilmington, Del., a corporation of Delaware No Drawing. Application August 9, 1940, Serial No. 351,960

3 Claims. (Cl. 260—354)

This invention relates to the preparation of new vat dyestuffs of the anthraquinone series. The invention relates more particularly to the preparation of new vat dyestuffs of the dibenzanthrone series which are produced by an alkaline condensation of aminodibenzanthrone compounds.

A number of dyestuffs of the dibenzanthrone series have been produced which dye in shades ranging from blue to green-black and some of these have been employed in the trade as black dyestuffs when shaded with sufficient amount of shading color.

It is the object of this invention to prepare new dyestuffs of the dibenzanthrone series which dye in gray to black shades of excellent fastness properties, being especially fast to chlorine and which dye in more neutral shades of gray and black and which are especially suitable for printing.

While it is disclosed in the prior art that dyestuffs may be prepared by the alkaline condensation of aminodibenzanthrones, nitrodibenzanthrones and the amino- or nitrodibenzanthronyls, we have found that new and more desirable dyes may be obtained if the fusion of aminodibenzanthrone compounds is carried out in the presence of oxidizing agents. By carrying out the alkali fusion in the presence of an oxidizing agent we obtain dyestuffs which exhibit improved properties, such as build-up and bleach fastness and which are particularly suitable for use in printing textile fabrics, a use for which many of the prior art products are not especially suitable particularly in heavy shades. We are also able to obtain dyes which dye in more neutral shades of gray and black than are obtained by the ordinary fusions.

By the term "alkaline condensation" we refer to fusion with potassium or sodium hydroxide or mixtures thereof in the presence or absence of alcohols or inert diluents such as naphthalene, toluene, xylene, kerosene, etc. The oxidizing agents which may be used are those which furnish oxygen in a moderate rate in alkaline solution or suspension such as, for example, sodium or potassium chlorate, chromates, nitrites, manganese dioxide, etc.

The aminodibenzanthrone compounds which may be employed are the aminodibenzanthronyls, as well as the ring closed aminodibenzanthrones for the aminodibenzanthronyls are ring closed by the alkaline fusion in the presence of the oxidizing agents to give the corresponding dibenzanthrones. The orientation of the aminogroups will be different in those aminodibenzanthrones where the nitro or amino groups have been introduced into the dibenzanthronyls prior to ring closure than in those in which the nitro group is introduced after ring closure and somewhat different shades of gray to black will be obtained. The percentage of nitrogen in the starting materials may vary within reasonable limits. We have found that those compounds which contain from 4 to 7% nitrogen give particularly desirable gray to black dyestuffs when subjected to the process of this invention. The temperature at which the fusion may be carried out may be varied widely although temperatures between 170° and 250° C. are preferred. When higher temperatures are employed an undue loss of nitrogen from the final product occurs with a noticeable change in the dyeing characteristics of the dyestuff. The following examples are given to illustrate the invention. The parts used are by weight.

Example 1

A mixture of 96 parts of potassium hydroxide and 34 parts of sodium hydroxide is heated to fusion in an iron vessel fitted for agitation. At 220° C., 8 parts of anhydrous sodium acetate are added and the melt is stirred for a few minutes, then 4.6 parts of potassium chlorate are added and the temperature is allowed to drop to 190° C. At this point addition of a mixture of 8 parts of sodium phenolate and 24 parts of diamino-dibenzanthrone is commenced. Addition is continued over a one-half hour period while raising the temperature of the melt so as to maintain the desired fluidity. The temperature is raised to 290° C. at the end of the addition and is maintained at that point until a test dyeing of a small sample shows that the starting material has been used up, as evidenced by disappearance of the green shade of the dyeing. The molten mass is then transferred to a larger vessel, cooled in the form of a thin layer, then slurried in a large volume of water. The slurry is aerated to precipitate all the dyestuff, after which the latter is filtered off, washed alkali-free and dried.

The product, obtained in excellent yield, is a black powder which dissolves in sulfuric acid with a violet coloration and which dyes cotton from a violet vat in gray to black shades. When converted to a paste as by dissolving in sulfuric acid, reprecipitating by partial water dilution, drowning, filtering, washing and milling the filter cake with water or water miscible hydrotropic liquids such as triethanolamine, glycerine, diethylene glycol, etc., the product can be printed on cotton or on regenerated cellulose fabrics, giving gray to black shades which show unusual build-up (that is, the formation of heavy black shades before a saturation point is reached). The printed color possesses excellent properties of fastness and is unchanged in shade by water-spotting.

Example 2

A mixture of 63 parts of methanol, 37.5 parts of anhydrous sodium acetate and 131 parts of potassium hydroxide is heated for a short time at 105–110° until a smooth melt is obtained. Then 131 parts of potassium hydroxide are added, the mixture is heated to 130–135° (with constant agitation) and 375 parts of molten naphthalene are added, followed by 25 parts of sodium nitrite ($NaNO_2$). The temperature of the melt is raised to 170° C. and at 170–180° C., 75 parts of diaminodibenzanthrone are added in small portions so as to minimize foaming. After the addition is complete, the mass is stirred at 170–180° for about one hour; then the temperature is raised gradually to obtain vigorous boiling (about 210° C.) and maintained thereat for about 3 hours. The gray to black vat dye so formed is isolated by first removing the naphthalene (either by steaming or by vacuum distillation), then diluting with water, aerating, filtering, etc. The product is similar to that of Example 1 in properties, but prints in somewhat redder and brighter shades than the latter.

Example 3

A smooth melt of 40 parts of methanol, 25 parts of anhydrous sodium acetate, 175 parts of potassium hydroxide and 7 parts of sodium chloride is made up by heating gradually to 130–135° C. under agitation. To this melt, 125 parts of mixed xylenes (solvent naphtha) are added. The temperature is adjusted at 120° C. and 50 parts of diamino-dibenzanthrone are added, followed by 40 parts of manganese dioxide (pyrolusite). The latter is added in small portions, to avoid thickening and foaming, at 125–130° C. The temperature is raised gradually and solvent is distilled off at atmospheric pressure until the melt reaches a temperature of 210° C. Fusion is contained for 1 hour at 210° after which the melt is allowed to cool to about 150° C. when water is dripped in slowly to maintain a stirrable liquid as the mass cools. The mass is finally diluted to 4000 parts total, heated to 65° C. and vatted by addition of 50 parts of sodium hydrosulfite. The vat is filtered to rid of excess manganese dioxide and other insoluble material. Aeration of the vat gives a shiny black solid in excellent yield. The product resembles that of Example 2 in properties and shade of prints.

By using an aminodichlorodibenzanthrone obtainable by the process of copending application, Serial No. 301,752, instead of diaminodibenzanthrone still more neutral shades of gray-black are obtainable.

Example 4

A naphthalene-nitrite-alcohol caustic melt is made up as in Example 2 from the following materials:

| | Parts |
|---|---|
| Methanol | 25 |
| Anhydrous sodium acetate | 15 |
| Caustic potash | 105 |
| Naphthalene | 150 |
| Sodium nitrite | 22.5 |

To this melt, at 170–175°, there is added 30 parts of diamino-dibenzanthrone over the course of one-half hour. The temperature is raised gradually to 210° C. and maintained at that point for about one hour or until the green shade of a test dyeing has changed to gray. The product is isolated as in Example 2. It gives reddish gray-black prints on cotton or rayon, the printed color showing excellent fastness to bleach, trubenizing, water-spotting and light.

By using other alcohols in the above example, similar products are obtained.

Example 5

A mixture of 96 parts of potassium hydroxide and 34 parts of sodium hydroxide is melted, and, at 220° C., 8 parts of anhydrous sodium acetate are added. After mixing for a short time at 220–205° C., 4.6 parts of potassium nitrite ($KNO_2$) are added, followed at 200–190° C. by a mixture of 24 parts of sodium phenolate and 24 parts of diamino-Bz-1:Bz-1'-dibenzanthronyl (see U. S. 1,957,459). The temperature is raised quickly to 220° C. and then slowly to 265° C. within a period of about 1 hour. The product, isolated as in Example 1, is a bluish gray-black of excellent dyeing, printing and fastness properties. Diaminodibenzanthrone is formed as an intermediate product in this alkaline fusion.

As illustrated by the above examples the alkaline fusion may be carried out in the presence or absence of diluents. The reaction may also be carried out in the absence of a flux such as sodium acetate, although the use of such a flux is preferred.

We claim:

1. The process for preparing gray to black vat dyes which comprises subjecting an aminodibenzanthrone to a caustic alkali fusion in the presence of an oxidizing agent, until conversion of the aminodibenzanthrone to the gray to black vat dye is completed.

2. The process for preparing gray to black vat dyes which comprises subjecting an aminodibenzanthrone having a nitrogen content of from 4 to 7% to a caustic alkali fusion in the presence of an oxidizing agent, until conversion of the aminodibenzanthrone to the gray to black vat dye is completed.

3. The gray to black vat dyes obtained by the process of claim 2.

ALEXANDER J. WUERTZ.
MELVIN A. PERKINS.
WILLIAM T. GRANGER.